D. R. DAVIS.
SPRING DRAFT APPLIANCE.
APPLICATION FILED DEC. 19, 1908.
923,953.
Patented June 8, 1909.
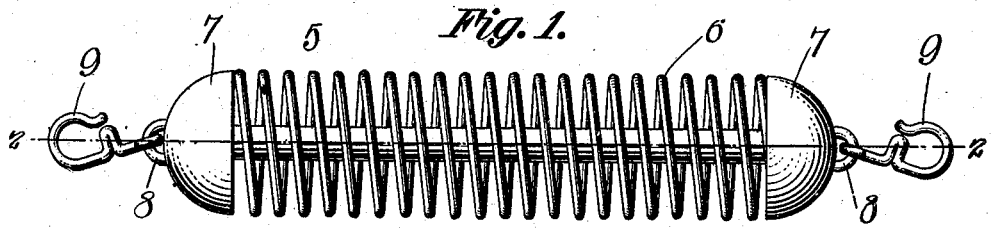
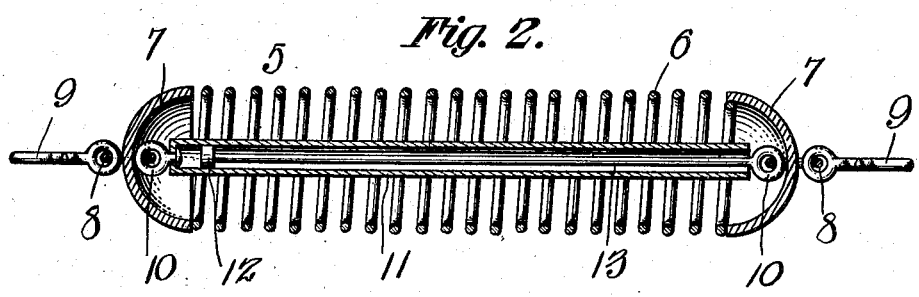
Witnesses
Chas. C. Richardson
F. O. _____
Inventor
Daniel R. Davis,
By _____
Attorneys

UNITED STATES PATENT OFFICE.

DANIEL R. DAVIS, OF DOVER, DELAWARE.

SPRING DRAFT APPLIANCE.

No. 923,953. Specification of Letters Patent. Patented June 8, 1909.

Application filed December 19, 1908. Serial No. 468,379.

*To all whom it may concern:*

Be it known that I, DANIEL R. DAVIS, a citizen of the United States, residing at Dover, in the county of Kent, State of Delaware, have invented certain new and useful Improvements in Spring Draft Appliances; and I do hereby declare the following to be a full, clear, and exact description of the invention, such as will enable others skilled in the art to which it appertains to make and use the same.

The invention relates to a draft appliance and more particularly to spring draft appliances for use with harness.

The primary object of the invention is the provision of a spring draft appliance for harness in which the strain is relieved from a draft animal or animals upon the starting or pulling of a heavy loaded team, such as a wagon or the like, and will relieve jerks and jars and prevent sore shoulders of the animal.

A further object of the invention is the provision of a spring draft appliance for harness which is simple in construction, thoroughly efficient in operation, durable, and inexpensive in the manufacture.

With these and other objects in view the invention consists in the construction, combination and arrangement of parts as will be hereinafter described, illustrated in the accompanying drawings which disclose the preferred form of embodiment of the invention and as brought out in the appended claims. It is to be understood, however, that minor changes, variations and modifications may be made such as come properly within the scope of the appended claims without departing from the spirit of the invention.

In the drawings: Figure 1 is a side elevation of one form of embodiment of the invention. Fig. 2 is a longitudinal sectional view thereof.

Similar reference characters indicate corresponding parts throughout the several views in the drawings.

In the drawings the numeral 5 designates generally the spring draft appliance which comprises a convoluted spring 6 which may be of any desirable length and strength and to opposite ends of this spring is connected head pieces or metal straps 7 the same having formed centrally thereof eyes 8 to which are connected snap hooks or other fasteners 9 so that the appliance can be connected to a harness structure at any suitable locality thereof at which point the same is desired to be used.

Projecting inwardly from the head pieces 7 centrally thereof are eyes 10 to one of which is connected a hollow tube or shell 11 which latter is housed by the spring 6 and working within the tube or shell 11 is a piston head 12 formed on the end of a stem or rod 13 which latter has its opposite end connected to the other eye 10 so that upon the expansion of the spring 6 the said piston head will slide in one direction in the tube or shell and thereby prevent sudden jars or shocks to be exerted upon the spring. It will be seen that with the appliance in use when the first pull or strain is given as in starting a team, the spring 6 will yield or stretch and immediately recover itself in a gradual and even manner due to the working of a piston in the tube or shell and thus preventing any sudden shock or jar to the draft animal, vehicle or any injury to the harness.

From the foregoing description taken in connection with the drawings, the construction, operation and advantages of the invention will be readily understood without requiring further description.

It will be obvious that the appliance will effectually prevent all sudden strain or jerk in starting thus overcoming injury to the harness, the vehicle and to the draft animal or animals. In using the appliance or harness while plowing it prevents many breaks in the plow and harness occasioned by the plow striking against roots or obstructions.

What is claimed is—

1. An appliance of the class described comprising a coiled spring, semi-spherical-shaped heads connected to opposite ends of said spring, a hollow tube located centrally within the spring and having one end loosely connected centrally to one head, and a rod having a piston head working in said tube and loosely connected to the other head.

2. An appliance of the class described comprising a coiled spring, semi-spherical-shaped heads connected to opposite ends of said spring, a hollow tube located centrally within the spring and having one end loosely connected centrally to one head, a rod having a piston head working in said tube and
5 loosely connected to the other head, and attaching means loosely connected centrally to the exterior faces of said heads.

In testimony whereof, I affix my signature, in presence of two witnesses.

DANIEL R. DAVIS.

Witnesses:
   BRICE VIRDIN,
   WILLIE DAVIS.